United States Patent [19]

Alba

[11] Patent Number: 4,844,341

[45] Date of Patent: Jul. 4, 1989

[54] CIBERNETIC FOUNTAIN APPARATUS AND VALVE THEREFOR

[75] Inventor: Emilio C. Alba, Madrid, Spain

[73] Assignee: Gibbs & Hill Espanola, S.A., Madrid, Spain

[21] Appl. No.: 137,405

[22] Filed: Dec. 22, 1987

[30] Foreign Application Priority Data

Jan. 15, 1987 [ES] Spain ........ 8700079

[51] Int. Cl.⁴ ........ F21P 7/00; A01G 27/00; A62C 37/20; B05B 1/30

[52] U.S. Cl. ........ 239/18; 239/69; 239/562; 239/581.1; 137/625.32; 137/625.3; 251/129.2; 251/129.08

[58] Field of Search ........ 239/16–18, 239/66, 67, 69, 211, 562, 581.1; 137/625.32, 625.3; 251/129.2, 129.08

[56] References Cited

U.S. PATENT DOCUMENTS

| | | | |
|---|---|---|---|
| 1,977,997 | 10/1934 | Patterson | 239/17 |
| 2,787,495 | 4/1957 | Przystawik | 239/17 |
| 2,843,149 | 7/1958 | Peters | 137/625.32 X |
| 2,970,771 | 2/1961 | Przystawik | 239/17 |
| 3,168,246 | 2/1965 | Musgrave | 239/22 |
| 3,292,861 | 12/1966 | Kawamura et al. | 239/17 |
| 3,307,787 | 3/1967 | Hall, Jr. | 239/17 |
| 3,337,133 | 8/1967 | Duerkob | 239/18 |
| 3,506,237 | 4/1970 | Tometsko | 251/129.2 |
| 3,570,764 | 3/1971 | Inoue | 239/17 |
| 3,595,479 | 7/1971 | Freeman | 239/23 |
| 3,773,258 | 11/1973 | Hruby, Jr. | 239/17 |
| 3,820,716 | 6/1974 | Bauer | 239/102 |
| 3,829,026 | 8/1974 | Aghnides | 239/394 |
| 3,864,031 | 2/1975 | Hossfeld et al. | 251/129.2 |
| 3,907,204 | 9/1975 | Przystawik | 239/242 |
| 3,941,154 | 3/1976 | Bishop | 137/624.15 |
| 4,614,300 | 9/1986 | Folcoff | 239/69 X |

FOREIGN PATENT DOCUMENTS

| | | | |
|---|---|---|---|
| 1272504 | 7/1968 | Fed. Rep. of Germany | 239/16 |
| 2359717 | 6/1975 | Fed. Rep. of Germany | 137/625.3 |
| 429695 | 8/1974 | Spain . | |
| 531050 | 3/1984 | Spain . | |
| 1066662 | 1/1984 | U.S.S.R. | 239/17 |
| 1212620 | 2/1986 | U.S.S.R. | 239/18 |
| 11062 | of 1884 | United Kingdom | 239/17 |

*Primary Examiner*—Andres Kashnikow
*Assistant Examiner*—Patrick N. Burkhart
*Attorney, Agent, or Firm*—Pennie & Edmonds

[57] ABSTRACT

An automatic system for the selective distribution of liquid streams comprising a plurality of nozzles, each with an inlet end and an outlet end and adapted to permit a flow therethrough of a liquid stream, the flow being variable in intensity. The invention further comprises a valve for controlling the flow intensity of the liquid stream through each nozzle and at least one decorative element coordinated with the flow of the liquid, wherein the flow through the nozzle is individually controllable for each nozzle by a microprocessor.

20 Claims, 8 Drawing Sheets

CIBERNETIC FOUNTAIN APPARATUS AND VALVE THEREFOR

FIELD OF THE INVENTION

The invention relates to ornamental fountains, and more particular to cibernetically controlled fountains having independently controllable valve nozzles.

BACKGROUND OF THE INVENTION

In order to better understand the present invention, reference is made below to the technological milestones which have marked the development of ornamental fountains. Each successive stylistic step has been the consequence of the historical, technical and artistic context of its period. The fact that water jets and lighting elements depend on a suitable, constant source of energy has characterized the stylistic advance of ornamental fountains as very sensitive to the technical factors present during each period.

For this reason, until the development of electrical power sources at the end of the last century, ornamental fountains could simply be defined as fixed aquatic architecture, purely sculptural, and lacking their own lighting. Most of the time, water represented a mere accompaniment to the main motif of the fountain or sculptural group because the flow, which depended exclusively on pressures caused by natural differences in water levels, was scarce or intermittent. Consequently, the style of fountains during this period was linked to architecture or gardening, with a predominance of classical or baroque forms based on geometrical symmetries and repetitions.

The subsequent development of the electrical motor pump and the submersible water projector device provided autonomy to ornamental fountains. Water alone thus became capable of constituting the main motif of the fountain, observable both day and night. The possibilities of expression continued to be limited, however, by aquatic architecture which was fixed during this period, since technologically, it was not possible to vary the flows of the fountain. For this reason the creative efforts of those in the field was oriented toward the search for new water forms and different compositions. The style remained based on the classic geometry of symmetrical composition, since all the aquatic elements presented themselves simultaneously.

Thereafter, the related technology developed further and made it possible to incorporate systems utilizing the technique of sequential flow variation. As a result, the current state of the art, which could be called an electromechanical fountain, then appeared. Various devices were installed in these fountains, such as variable speed motors, motor-operated valves, mechanical programmers for sequential cutoff of the hydraulic circuits, etc.

A series of common characteristics governs these electromechanical ornamental fountains. For instance, it is possible to make various groups of aquatic elements appear or disappear. The fountain thus has various circuits that "play" with one another, forming various combinations which present themselves sequentially during a "period". The fountain can incorporate a program which, for example, is synchronized to a specific musical piece, as is the case in some recently developed fountains of which the inventors are aware.

Certain limitations must still be overcome, however. For example, the valves for varying the liquid flow in these prior art fountains are located in a fountain machine room. For reasons of cost, they cannot be extended to each individual water jet, but rather they extend to cut off circuits that group a number of jets. These cut off circuits channel large flows of water and are not numerous. This arrangement leads to the following consequences: firstly, since the jets appear or disappear in groups, it is not possible to create a fountain without a symmetry in the composition, so that the style of the fountain retains its classic character.

Secondly, the flows brought into pay require large cutoff periods to avoid problems associated with the water hammer effect and vibrations, which may result in drawn out responses, caused by the inertias of these circuits. This characteristic, together with the limited number of available independent circuits, permits little flexibility in programming because the response times are generally not compatible with other elements of a noninertial nature, i.e., lighting, music, laser beams, etc., which ordinarily are incorporated in modern fountains.

In summary, therefore, today's state-of-the-art electromechanical fountain is installed as a group of independent circuits, each made up of different jets, for which reason they adopt a geometric composition of classical style. When plays of water are incorporated, the time necessary for a response to changes in water pressure is unnecessarily long, while the possibility of obtaining different water jet combinations is small, since the number of independent circuits that comes into play rarely exceeds ten.

As an illustration of the deficiencies found in present state-of-the-art fountains, FIGS. 1 a-h show various flow combinations attainable with prior art electromechanical fountains. In the embodiment disclosed in FIG. 1, it is assumed that the fountain contains four independent circuits which can appear and disappear individually in the course of the program or sequence of plays of the fountain. These circuits are represented separately in four views: FIG. 1*a* illustrates a central vertical jet. Surrounding this central jet is a "palm tree" formed of eight parabolic jets as shown in FIG. 1*b*. Further, outside this "palm tree" is a crown of twenty four vertical jets as shown in FIG. 1*c*. FIG. 1*d* illustrates a cupola formed by twenty-four parabolic jets that flow from the periphery to the interior of the fountain.

In total, therefore, the illustrated example utilizes fifty seven jets, grouped in four circuits. The jets corresponding to each circuit are activated simultaneously, for which reason each circuit is arranged in a symmetrical manner around the main axis of the fountain. Obviously, deviating from this symmetry would negatively affect the aesthetic appeal of the fountain.

Some of the possible combinations that may be obtained by grouping the circuits in FIGS. 1 *a–d* are shown in FIGS. 1 *e–h*. It will be seen immediately that the number of these combinations is very limited. Specifically, with four circuits it is not possible to establish more than fifteen different combinations, which is determinable by the number of combinations that can be made with four elements taken in groups of one, two, three or four elements respectively.

In summary, therefore, due to the inertia factor, which prevents obtaining a rapid rhythm in the sequence of the plays and in synchronization with noninertial elements, current fountain architecture is restricted to some neoclassic rules of symmetry and very few possible combinations.

SUMMARY OF THE INVENTION

The capabilities of the above-described prior art fountains may be enhanced by the expressive possibilities offered by light, used both in the traditional form of underwater colored spotlights or through new spectacular techniques offered with the use of laser beams. Since light is a simple action, noninertial element, the integral control of a multitude of points or directions may be accomplished with a microprocessor, thus permitting the abandonment of the classical composition. The creation of forms, patterns and designs more in keeping with present trends in art may thus be accomplished.

It is therefore an object of the present invention to provide a cibernetic ornamental fountain having independently controllable nozzles, incorporating a series of spectacular, decorative elements of any imaginable type, such as colored spotlights, musical elements, laser beam projectors, etc., coordinated among themselves so that the most varied sensory perceptions may be attained.

This and other objects may be attained by utilizing the possibilities offered by the present technology of cibernetic science and its related fields such as robotics, information science, telematics, etc.

One embodiment of the invention comprises a novel valve apparatus which may be individually controlled and placed at the outlet end of a water jet nozzle. In this manner, the relative response time to changes in water pressure is minimized and the number of possible combinations is greatly expanded. The valve comprises a cylindrical cup forming a nozzle at a first end and having a plurality of windows around its circumference at a second end. A grooved wheel fits loosely into the cup and this wheel may be rotated to control the flow by blocking and unblocking the windows. The movement of the wheel is controlled by a positionable linear actuator which, in turn, is controlled by a microprocessor. The loose fit of the wheel in the cup prevents excessive wear and allows a small flow through the valve in the closed position which prevents the valve from clogging.

A second embodiment of the invention comprises a cibernetic fountain employing the valve of the present invention, which could be constructed with any number of individualized jets controlled at a rapid rate by a computer or programmable robot. Such a fountain is capable of creating multiple figures, variations, pursuits, etc., or interpreting any musical piece with a real aquatic ballet. In the case of a fountain constructed according to the present invention being of similar size to that of the prior art example, the number of possible combinations for the fifty seven elements described with regard to the prior art electromechanical fountain exceeds a hundred trilion. For these figures it is not possible to speak of a quantitative, but what is more important of a qualitative leap. That is to say that it is not possible to represent in figures all the unlimited possibilities that are opened up by the present apparatus since it provides a system with innumerable degrees of freedom.

By analogy, a cibernetic fountain as described herein may be compared to a graphic screen of a computer in which each element or pixel has an individualized, simultaneous control of its intensity and color parameters, with noninertial variation. The expressive possibilities of these screens do not only depend on the screen itself but on the power of the computer to which they are connected, as is the case of animated cartoons.

Analogously, a cibernetic fountain can be structured by having a sufficiently ample network of nozzles and colored spotlights. A further embodiment of the present invention is a method for selectively distributing a plurality of liquid streams in a manner so as to create the multiple figures, variations and pursuits as described above and/or with the intention of interpreting a musical score by creating an aquatic ballet corresponding thereto. The selective operation of various groups of elements according to a pre-selected program can give rise to an infinite number of figures and fantasies. Fish, boats, flowers, trees, abstract bodies, ballerinas, etc., can appear, move and dance with no limitations other than the imagination of the designer and programmer of the fountain.

BRIEF DESCRIPTION OF THE DRAWINGS

FIG. 1 generally illustrates a typical prior art fountain having four separate water circuits. Each circuit is individually portrayed in FIGS. 1 *a–d*. FIGS. 1 *e–h* show some of the different combinations obtainable;

DETAILED DESCRIPTION OF THE INVENTION

Figures 1A, 1B, 1C, 1D:
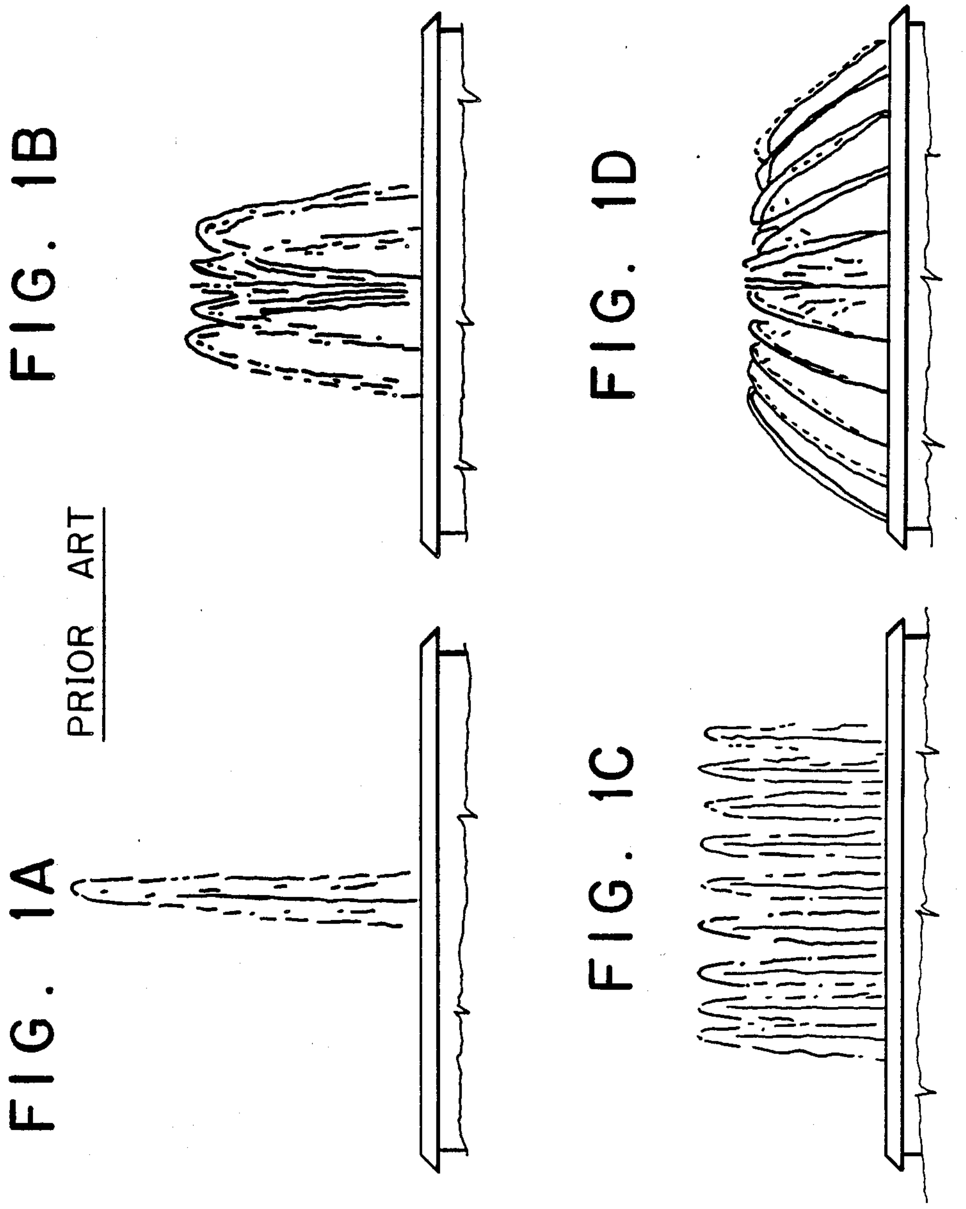
FIG. 1*a* is a central vertical jet.
FIG. 1*b* is a palm tree-like configuration of eight parabolic jets.
FIG. 1*c* is a crown of twenty four vertical jets.
FIG. 1*d* is a cupola formed by twenty four parabolic jets.
Figure 1E:
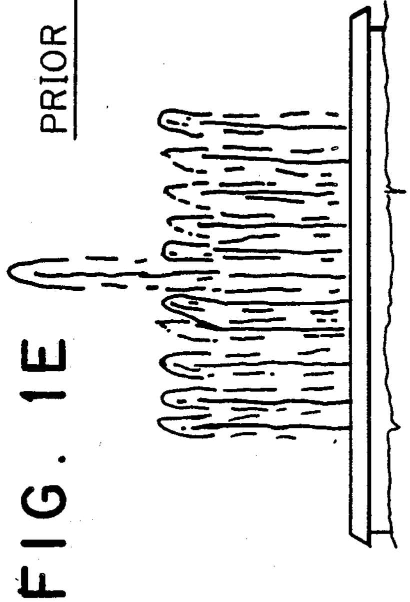
FIG. 1E PRIOR ART
FIG. 1*e* shows a combination of jets as shown in FIGS. 1*a* and 1*c;*
Figure 1F:
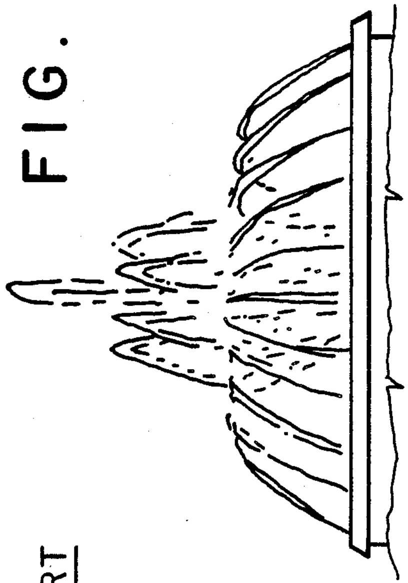
FIG. 1*f* shows a combination of jets as shown in FIGS. 1*a*, 1*b* and 1*d*.
Figure 1G:
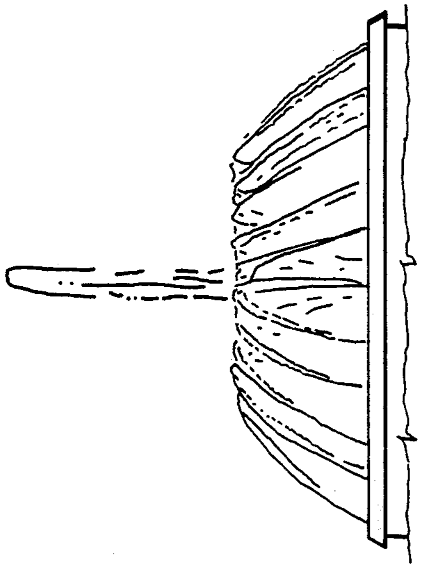
FIG. 1*g* shows a combination of jets as shown in FIGS. 1*a* and 1*d;*
Figure 1H:
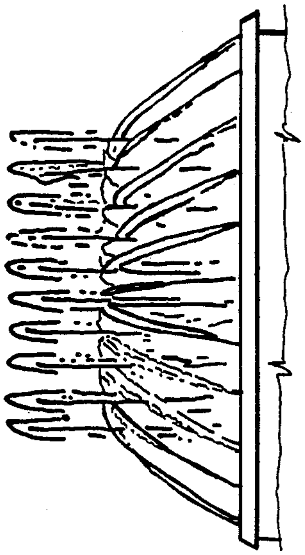
FIG. 1*h* shows a combination of jets as shown in FIGS. 1*c* and 1*d;*
Figure 2A:
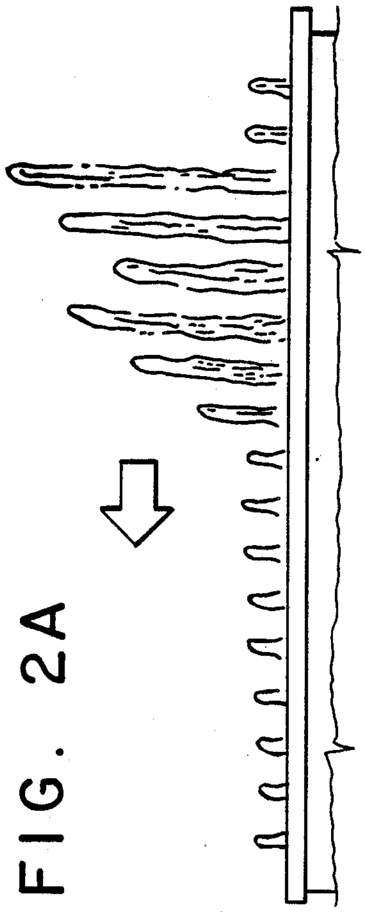
FIG. 2*a* shows a representative display which could be created with the cibernetic fountain of the present invention. The two views indicate motion of a sail-like figure in the direction of the arrows.
Figure 2B:
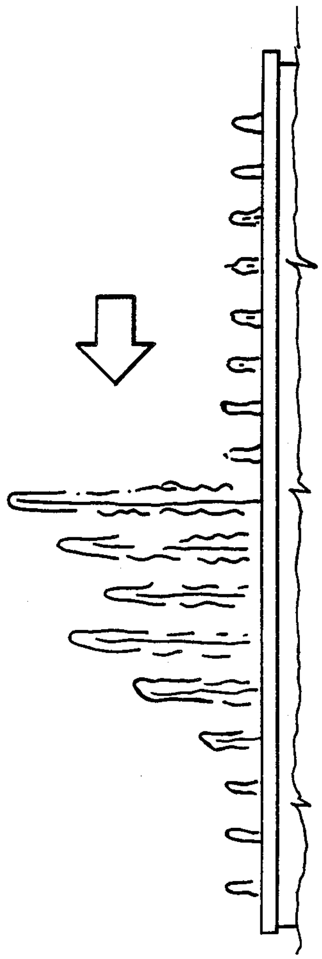
FIG. 2*b* shows a sine wave formation created with the cibernetic fountain of the present invention. Again, the two views indicate motion of the figure in the direction of the arrows.
Figure 2C:
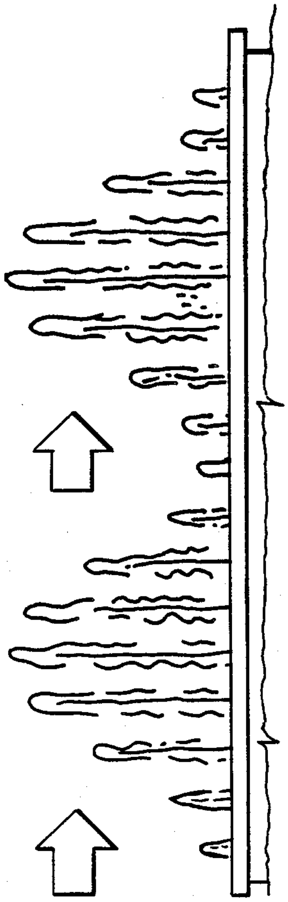
Figure 2D:
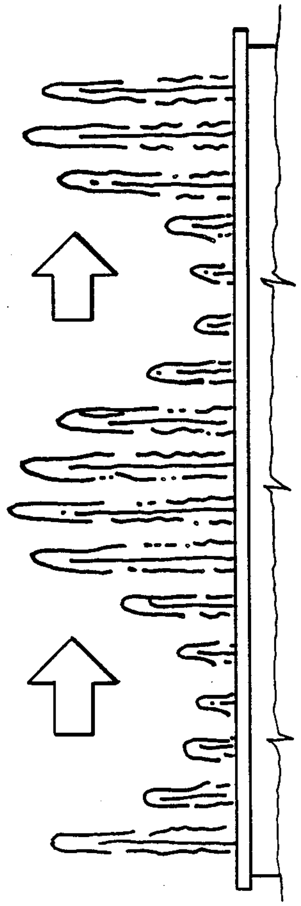

By way of nonlimiting example, FIGS. 2*a*, and 2*b* illustrate the expressive characteristics of the present cibernetic fountain. In these figures a small group of vertical jets are represented which, when controlled by the valve apparatus disclosed herein, can create mobile figures which are transmitted along the fountain in the same way as the undulating movement of a wave, i.e., without there being a physical transmission of material. FIG. 2*a* represents sails that advance whereas, in FIG. 2*b* there are represented waves that travel through the fountain. This is in contrast to the traditional fountain (FIG. 1) where the only possible movement is one-dimensional, i.e., in height, that is to say that the jet only goes up or down.

In the present cibernetic fountain, another dimension is added i.e., that of horizontal movement, either in a direction crosswise to the observer or in depth. With this new spatial dimension, additional opportunities are gained in figurative expression, i.e., in addition to the capacity to synchronize each point of water with a spotlight. In this manner, color has finally been associated with water with equal expressive richness. In fact, the freedom of expression offered by the subject fountain is now total since a composition does not have to be subjected to a classic symmetry, due to the fact that each jet is independent of the rest.

The water now becomes a protagonist and can carry on a dialogue with the light to the rhythm of an accompanying musical selection. Even without music, however, the most varied designs and movements can be created. The present fountain may now be considered as a medium of expression having sufficient class individually to rise to the level of present-day art. The cibernetic fountain is designed to obtain an individualization of its elemental jets, with the possibility of direct operation by a microprocessor, and with a suitable respect for noninertial elements. This makes possible not only a total integration of water, light and music but also a flexibility and total freedom in fountain design, capable of meeting by forms and original movements the creative requirements of modern art.

The present fountain is provided with a plurality of nozzles, each controlled by a corresponding valve. These valves may be individually, simultaneously controlled by a microprocessor unit utilizing a specialized program, so that each nozzle can selectively vary the liquid flow and therefore the height of the jet associated with it. The present fountain may also incorporate complementary ornamental elements such as colored lights, music, laser beams, etc., which may be integrated in a synchronized manner with the water in the program controlled by the microprocessor.

Figure 3:
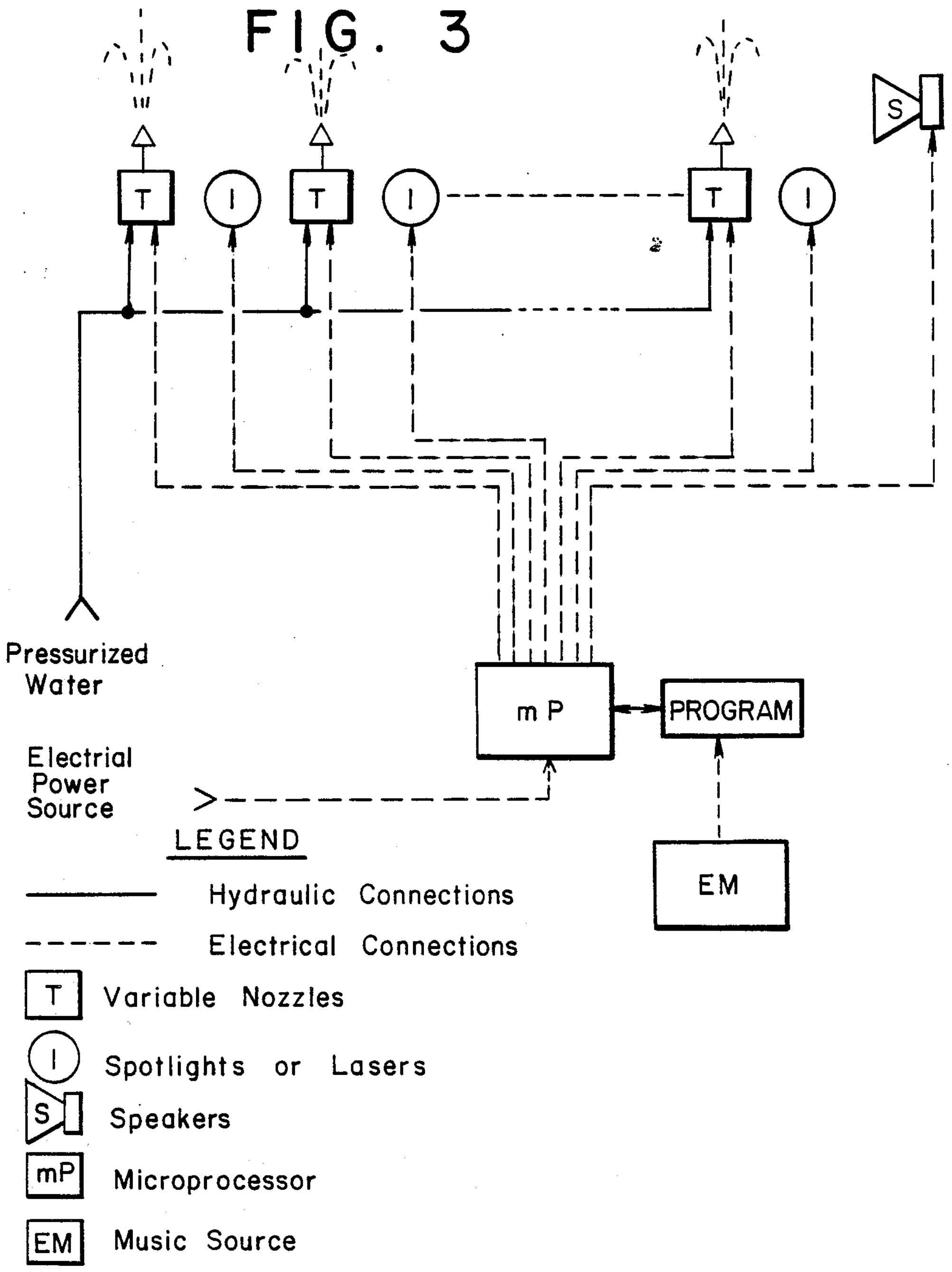
FIG. 3 is a schematic diagram of the cibernetic fountain of the present invention.

A preferred embodiment of the invention is schematically illustrated in FIG. 3, which diagrams the characteristic elements of the present cibernetic fountain: the cutoff elements, i.e., variable nozzles, which are specifically set for each individual jet, the light and musical elements, the control microprocessor with its specific program, and the hydraulic and electrical means of connecting all the elements together.

In the present description, it is, of course, assumed that the necessary supplies of pressurized water and electrical power are available. The variable nozzles are connected to the water network with a suitable connecting means and the microprocessor is electrically connected, as are the light and musical elements. Musical reproduction equipment supplies suitable input sounds or excitation for the microprocessor which, upon following the instruction of the specific program, produces the output signals for the synchronized control of the visible elements of the fountain.

In the embodiment described above, nozzles are available in sufficient number to provide the desired effects. Each of the variable nozzles is characterized by a means for ejection of water which comprise small openings therein, means for flow regulation, i.e., variable cutoff and means for electrical control and connection of the microprocessor. By way of nonlimiting illustration, a variable nozzle according to the invention is represented in FIGS. 4*a* and 4*b*.

Figure 4A:
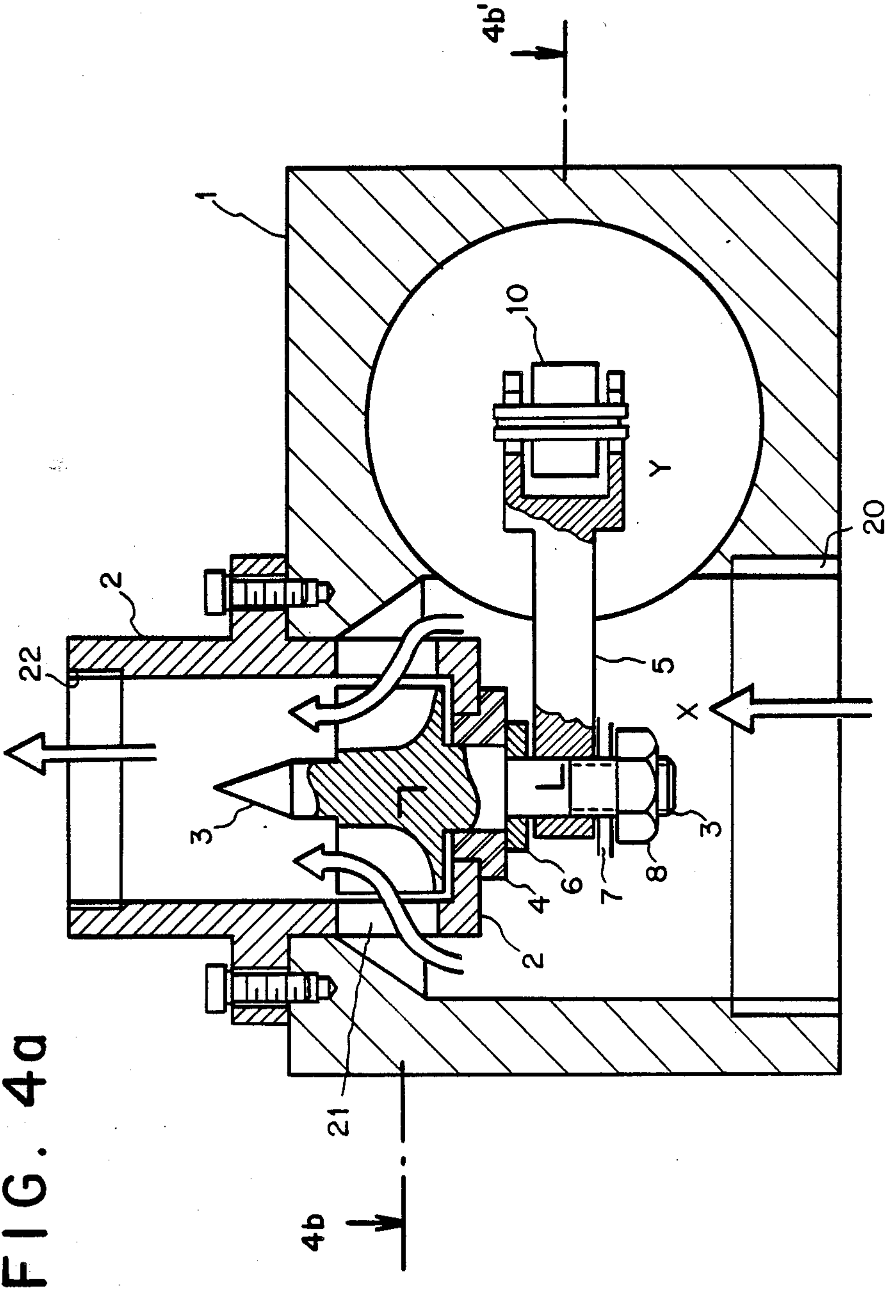
FIG. 4*a* shows in elevation a cross-section of the valve and nozzle arrangement of the present invention.
Figure 4B:
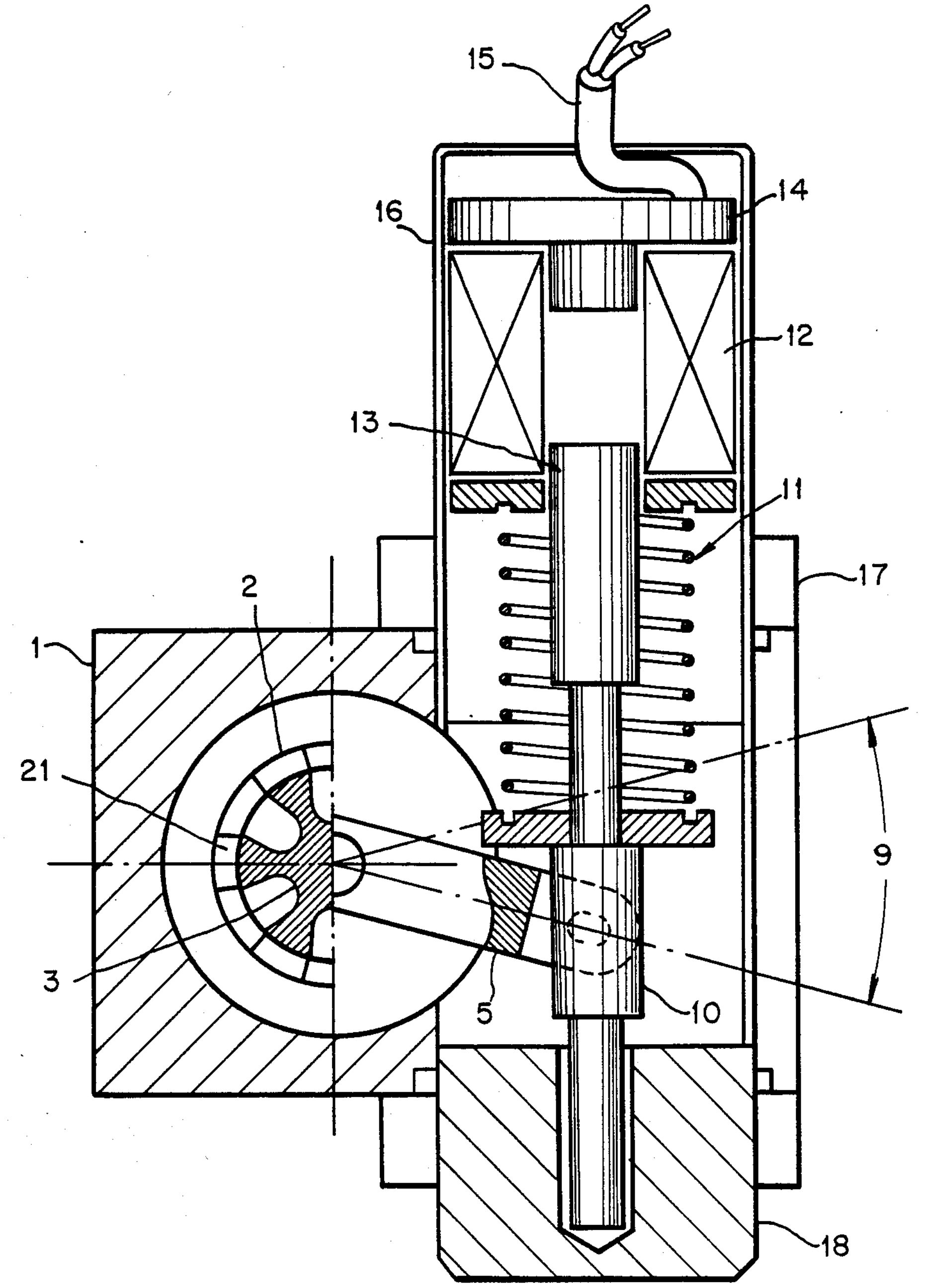
FIG. 4*b* shows a cross-section through line A–A' of the valve of FIG. 4*a;*

In FIG. 4*a* the flow is diagrammatically represented by the direction of the arrows. The nozzle consists of prismatic body 1, in which two cylindrical housings X, Y have been made; the first (X) forms the water passage duct and contains the cutoff elements. The second (Y), oriented in a direction perpendicular to the first, serves as a location for insertion of the control devices. A threaded portion 20 on the lower end of the first housing (X) provides a means for fastening the nozzle unit to the water piping.

Cylindrical metal cup 2, fastened to body 1, is provided with passages 21 around its circumference through which the water flows. Cup 2 contains a cutoff device consisting of a one-piece cutoff wheel 3 and shaft unit. The lower end of the shaft goes through an antifriction bearing 4 and is provided with a threaded end. The threaded end provides a fastening for handle 5 comprising support washer 6, lock washer 7, and nut 8.

Figure 5:
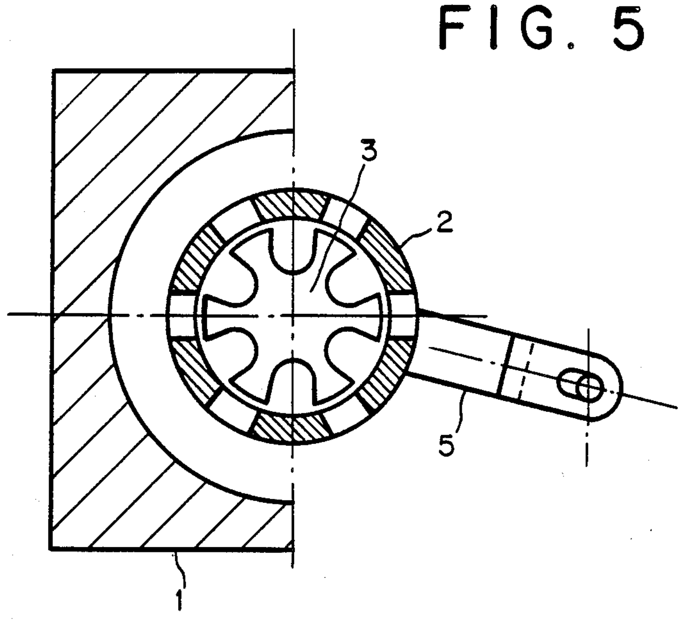
FIG. 5 shows the valve cutoff wheel of the invention in the fully closed position.
Figure 6:
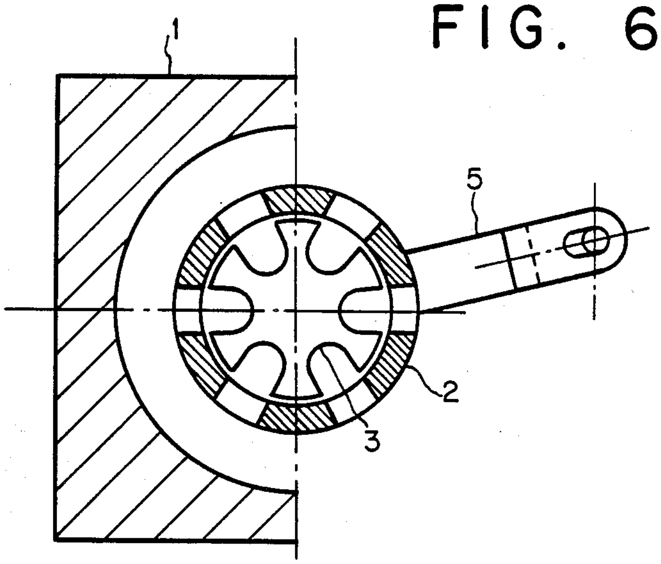
FIG. 6 shows the subject valve cutoff wheel in the fully open position.

Cutoff wheel 3 is formed by a cylinder in which six deep notches are made, arranged symmetrically as can be seen in FIGS. 5 and 6. The notches may alternately face passages 21 or the material of cap 2, in a manner to permit the passage of the water through passages 21 or to cut it off. An angular movement of handle 5 of about 30° causes cutoff wheel 3 to move from a closed position to an open position, while intermediate stages proportionally represent different flow values, which correspond to different jet heights.

It is important to note that appreciable play is left between cutoff wheel 3 and cup 2. Such play is perfectly compatible with the operation of the fountain because closing or canceling a jet does not actually require complete cutoff of the fluid passing therethrough. This loose fit is an important characteristic of the present design because it eliminates friction, jamming or clogging in a zone through which unclean water passes. It further provides the nozzle with a self-cleaning quality to assure a stable and extended operation.

The upper neck portion of cup 2 is provided with internal thread 22 to fasten thereto a specially adapted water outlet. Such an outlet may be used to create a number of different flow patterns, such as: free stream, parabolic jet, atomizing cloud, sheet, circular swing, etc.

The control elements of the variable nozzle of the invention are more clearly shown in FIG. 4*b* . Operating means, preferably electrical, causes the movement of handle 5 along its interval of travel 9 (equivalent to an angular movement of 30°) thus moving cutoff wheel 3 and thereby causing the variation in the jet flow. Electronic control of the movement of handle 5 is advantageous because it may be achieved by direct, simple connection to suitable control means, such as a computer or programmable robot based on a microprocessor.

With further reference to FIG. 4*b*, handle 5 is connected to stem 10 which, by the action of spring 11 and electromagnet 12, is subjected to a linear sliding movement. One end of stem 10 is rigidly connected to mobile armature 13, constructed of a ferromagnetic material, which slides inside a suitably dimensioned electric coil 12. Coil 12 incorporates rear stationary armature 14 to take maximum advantage of the resultant magnetic flux.

Both coil 12 and stationary armature 14, together with corresponding connecting conductors 15, are mounted in cylindrical case 16 which supports them. Case 16 allows for sealing of the unit with epoxy resin to assure electrical insulation. An electromagnetic subunit thus formed is inserted in body 1 and fastened by outside clamp 17.

When stem 10 is being mounted, spring 11, which works with compression, will also be inserted. When coil 12 is at rest, no force is exerted on armature 13 and the force of spring 11 is thus sufficient to bring the mechanism to the position shown, which corresponds to a closed nozzle. When the coil is electrically energized, armature 13 is subjected to a pulling force of a value similar to the opposing force of spring 11, whereby the mechanism moves to the other end of its travel as indicated in FIG. 6.

By the application of various energizing voltages to coil 12, handle 5 may be stopped at various intermediate points of travel, such points being defined by the balance between the opposing force of spring 11 and the pulling force of coil 12. In this manner, a continuous control of the flow and therefore of the height of the jet associated with the particular nozzle is established. Cover 18 constitutes a closing member and acts as a guide for the stem 10 to obtain a correct mechanical alignment.

It should also be pointed out that the constructive details of the valve, particularly the appreciable play between cup 2 and cutoff wheel 3 as well as its simplicity in operation, distinguish this device from any other electrohydraulic valve with total cutoff. Further, while it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

I claim:

1. An automatic system for the selective distribution of liquid streams comprising:

(a) a plurality of liquid delivery members, each said member having an inlet end and an outlet end and adapted to permit a flow therethrough of a liquid stream, said flow being of a variable intensity; and (b) valve means coupled to the outlet end of each said liquid delivery member for varying the flow intensity of said liquid stream through said delivery members, said valve means comprising (i) a cylindrical cup member having an inlet end and an outlet end, wherein said outlet end comprises nozzle means and said inlet end is constructed with a plurality of passage means arranged around a circumferential portion thereof to permit the entry of said liquid into an interior portion of said cup member;

(ii) a rotatable cutoff member disposed within said cylindrical cup member, said cutoff member having a number of grooved portions, each corresponding to one of said passage means, such that the cutoff member is rotatable around a central axis to open and close said passages as required to control an amount of liquid entering said cup member; and (iii) means for connecting said cutoff member to said flow control means and thereby facilitating the rotation of said cutoff member as required to control said liquid flow.

2. The system of claim 1 wherein said cutoff member is disposed within said cylindrical cup member in a manner to permit a degree of play between said cutoff member and an inner portion of said cup member sufficient to allow the passage of substantially all of any interfering particulate debris therethrough, so as to prevent said valve means from becoming clogged thereby.

3. The system of claim 1 wherein said inlet end of each said cylindrical cup member further comprises a threaded portion for mating engagement with the outlet end of one of said liquid delivery members.

4. The system of claim 1 wherein the rotation of said cutoff member is controlled by linear actuating means, a first end of which is rigidly connected thereto, and wherein a second end of said means is associated with microprocessor means for controlling the movement thereof.

5. The system of claim 4 wherein said outlet end of said cylindrical cup member further comprises a threaded portion for mating engagement with spray head means adapted to create a predetermined flow pattern.

6. The system of claim 4 wherein an effect produced by at least one decorative means, operatively associated with said microprocessor means, is coordinated with said flow of said liquid.

7. The system of claim 6 wherein said at least one decorative means is a spotlight, a music source or a laser beam projector.

8. The system of claim 4 wherein the second end of said linear actuating means is pivotably coupled to longitudinally slideable stem means, said stem means being capable of linear reciprocal movement so as to permit the rotation of said cutoff members upon the movement of said stem means.

9. The system of claim 8 wherein an angular movement of said actuating means of about 30° results in the cutoff member alternating between a substantially open position and a substantially closed position.

10. The system of claim 8 wherein an angular movement of less than about 30° by said actuating means proportionately controls the amount of said liquid which may enter through said passage means and thus has a corresponding effect upon the intensity of said liquid stream passing therethrough.

11. A cibernetic fountain apparatus which comprises:

(a) a plurality of liquid delivery members, each having an inlet end and an outlet end and adapted to permit the flow therethrough of a liquid stream, said flow being of a variable intensity;

(b) a valve adapted for attachment to said outlet end of each of said delivery members, each valve comprising:

(i) a cylindrical cup member having an inlet end and an outlet end, wherein said outlet end comprises a nozzle and said inlet end is constructed having a plurality of passage means to permit the entry of said liquid therethrough and into an interior portion of said cup member;

(ii) a cutoff member, disposed within said cylindrical cup member and circumferentially rotatable between a first open position and a second closed position, said cutoff member having a number of grooved portions, each corresponding to one of said passage means, said cutoff member further being positioned disposed within said cup member so as to permit an appreciable degree of play between said cutoff member and an interior portion of said cup member, so as to prevent said valve from becoming clogged by particulate debris; and (iii) linear actuation means having a first end coupled to said cutoff member and a second end associated with a microprocessor device for controlling the movement of said cutoff member, said outlet end of said cylindrical cup member further comprising a threaded portion for mating engagement with spray head means adapted to create a predetermined flow pattern, and (c) at least one decorative element selected from spotlights, a musical source and laser beam projectors, an effect produced by said element being coordinated with said liquid flow.

12. A valve for selectively controlling a stream of a liquid, said valve comprising:

(a) a body portion comprising a cylindrical cup member, said cup member having an inlet end and an outlet end, said inlet end coupled to a pressurized liquid delivery member and constructed with a plurality of passages arranged around a circumferential portion thereof to permit the entry of said liquid into an interior portion of said cup member, said outlet end forming a nozzle comprising spray head means threaded onto an upper portion of said nozzle for producing liquid streams therethrough having a predetermined configuration;

(b) a rotatable cutoff member disposed within said cylindrical cup member, said cutoff member having a number of grooved portions, each corresponding to one of said passage means, such that the cutoff member is rotatable to at least partially open and close said passages as required to control an amount of liquid entering said cup member; and (c) linear actuating means having a first end and a second end, for controlling the rotation of said cutoff member, said first end being rigidly connected to said cutoff member and said second end being pivotably coupled to longitudinally slideable stem means, said stem means being capable of linear reciprocal movement so as to permit the rotation of said cutoff member upon the movement of said stem means.

13. The valve of claim 12, wherein the movement of said cutoff member is controlled by microprocessor means operatively associated with said stem means.

14. The valve of claim 12 wherein said cutoff member is cylindrical in shape and is rotatable about a central axis so as to at least partially open and close said passages means.

15. The valve of claim 14 wherein said cutoff member is disposed within said cylindrical cup member in a manner to permit a degree of play sufficient to allow the passage of substantially all of any interfering particulate debris therethrough so as to prevent said valve from becoming clogged thereby.

16. The valve of claim 12 wherein an angular movement of said actuating means of about 30° results in the cutoff member alternating between a substantially open position and a substantially closed position.

17. The valve of claim 12 wherein an angular movement of less than about 30° by said actuating means proportionately controls the amount of said liquid which may enter through said passage means and thus has a corresponding effect upon the intensity of said liquid stream passing therethrough.

18. An automatic system for the selective distribution of liquid streams comprising:

(a) a plurality of liquid delivery members, each said member having an inlet end and an outlet end and adapted to permit a flow therethrough of a liquid stream, said flow being of a variable intensity; and (b) valve means coupled to the outlet end of each said liquid delivery member for varying the flow intensity of said liquid stream through said delivery members, said valve means comprising (i) a cylindrical cup member having an inlet end and an outlet end, wherein said outlet end comprises nozzle means and said inlet end is constructed with a plurality of passage means arranged around a circumferential portion thereof to permit the entry of said liquid into an interior portion of said cup member;

(ii) a rotatable cutoff member disposed within said cylindrical cup member, said cutoff member having a number of grooved portions, each corresponding to one of said passage means, such that the cutoff member is rotatable around a central axis to open and close said passages as required to control an amount of liquid entering said cup member; and (iii) means for connecting said cutoff member to said flow control means and thereby facilitating the rotation of said cutoff member is required to control said liquid flow, wherein the rotation of said cutoff member is controlled by linear actutating means, a first end of which is rigidly connected thereto, and wherein a second end of said means is associated with microprocessor means for controlling the movement thereof.

19. The system of claim 18 wherein the second end of said linear actuating means is pivotably coupled to longitudinally slideable stem means, said stem means being capable of linear reciprocal movement so as to permit the rotation of said cutoff members upon the movement of said stem means.

20. The system of claim 19 wherein an angular movement of less than about 30° by said actuating means proportionately controls the amount of said liquid which may enter through said passage means and thus has a corresponding effect upon the intensity of said liquid stream passing therethrough.

* * * * *